United States Patent
Aoyama

(10) Patent No.: US 6,763,471 B1
(45) Date of Patent: Jul. 13, 2004

(54) SINGLE CHIP MICROCOMPUTER WITH REDUCED CHANNEL LEAKAGE CURRENT DURING A STABLE LOW SPEED OPERATION STATE

(75) Inventor: Koichiro Aoyama, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 632 days.

(21) Appl. No.: 09/723,386

(22) Filed: Nov. 28, 2000

(30) Foreign Application Priority Data

Nov. 30, 1999 (JP) .......................................... 11-341488

(51) Int. Cl.⁷ ................................................. G06F 1/32
(52) U.S. Cl. .................................... 713/320; 713/322
(58) Field of Search ............................... 713/300, 320, 713/322, 324, 340

(56) References Cited

U.S. PATENT DOCUMENTS

| | | | | |
|---|---|---|---|---|
| 5,760,636 A | * | 6/1998 | Noble et al. ............... | 327/513 |
| 5,907,699 A | * | 5/1999 | Nakajima ................... | 713/501 |

FOREIGN PATENT DOCUMENTS

| | | | | |
|---|---|---|---|---|
| JP | 60-10318 | 1/1985 | | |
| JP | 63-126018 | 5/1988 | | |
| JP | 04247399 A | * 9/1992 | ........... | G11C/17/18 |
| JP | 6-139373 | 5/1994 | | |
| JP | 7-287699 | 10/1995 | | |
| JP | 8-87364 | 4/1996 | | |

* cited by examiner

Primary Examiner—Thomas Lee
Assistant Examiner—Paul Yanchus, III
(74) Attorney, Agent, or Firm—Choate, Hall & Stewart

(57) ABSTRACT

A central processing unit, a read only memory, a random access memory, an oscillator for supplying a clock signal to the central processing unit, a peripheral circuit and a control circuit are provided. The control circuit supplies a first voltage to the central processing unit, the read only memory, the random access memory and the peripheral circuit in synchronization with rising/falling of the clock signal, and supplies a second voltage to the central processing unit with passage of predetermined time after the rising/falling of the clock signal. The first voltage enables the central processing unit, the read only memory, the random access memory and the peripheral circuit to change their operations. The second voltage is lower than the first voltage, and enables the central processing unit, the read only memory, the random access memory and the peripheral circuit to maintain their operations.

7 Claims, 15 Drawing Sheets

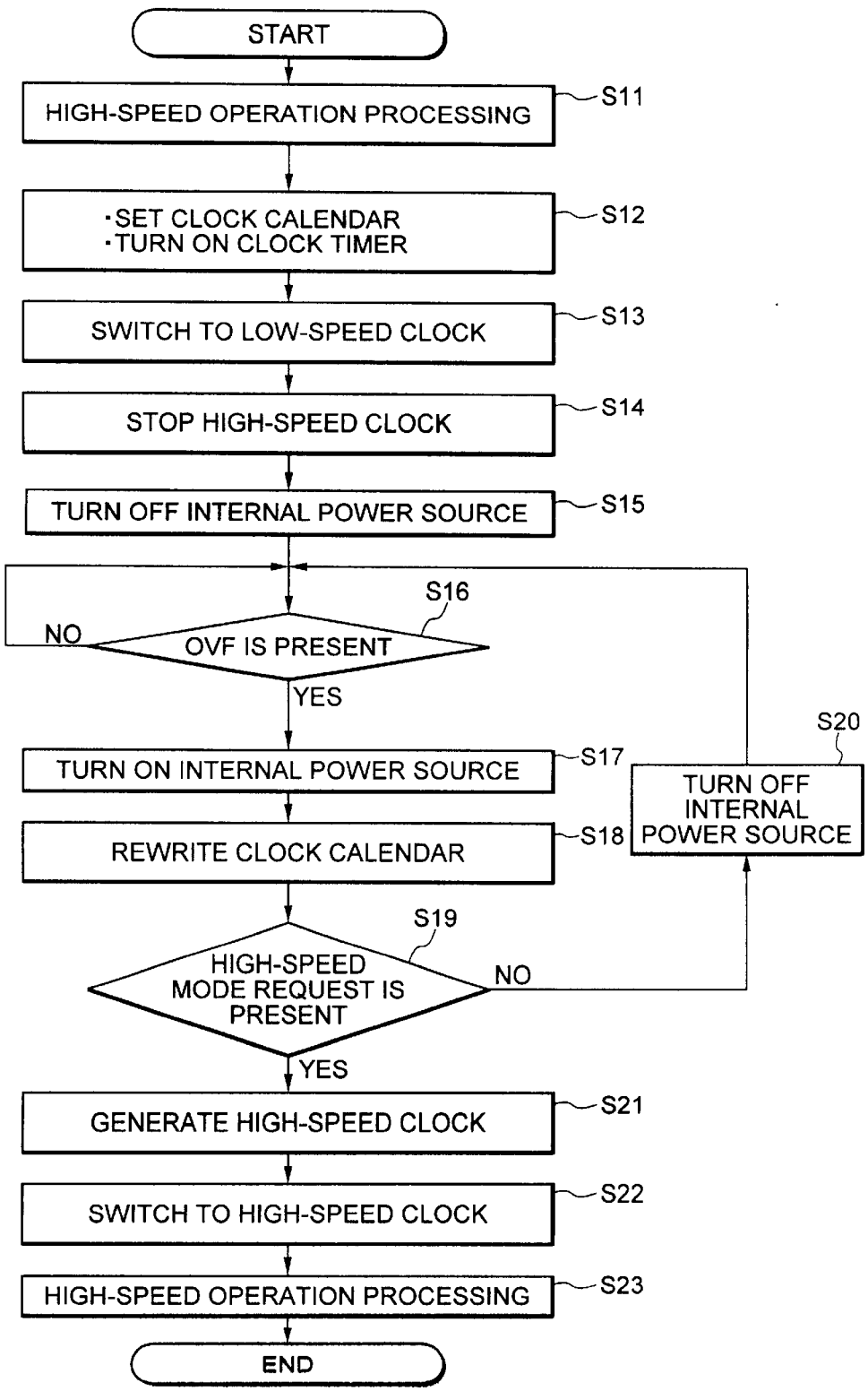

SINGLE CHIP MICROCOMPUTER WITH REDUCED CHANNEL LEAKAGE CURRENT DURING A STABLE LOW SPEED OPERATION STATE

BACKGROUND OF THE INVENTION

1. Field of the Invention

The present invention relates to a single chip microcomputer suitably used for an electronic device such as a video camera or the like operated at a plurality of speeds. More particularly, the invention relates to a single chip microcomputer capable of reducing power consumption.

2. Description of the Related Art

A conventional single chip microcomputer comprises two kinds of oscillators provided to generate high-speed and low-speed clock signals, respectively. During a high-speed operation, a central processing unit (referred to as a CPU, hereinafter) is operated by a high-speed clock signal. During a low-speed operation, the CPU is operated by a low-speed clock signal. FIG. 1 is a block diagram showing the constitution of such a conventional single chip microcomputer.

The conventional single chip microcomputer shown comprises first and second oscillators 103 and 104, to which power supply voltage Vdd is supplied from a power supply terminal. An oscillation frequency of the first oscillator 103 is set equal to, e.g., 20 MHz, while an oscillation frequency of the second oscillator 104 is set equal to, e.g., 32 kHz. In other words, the first oscillator 103 is designed for a high-speed clock signal, whereas the second oscillator 104 is designed for a low-speed clock signal.

The single chip microcomputer also comprises a selector 105 which is provided to select each of the clock signals G5 and G6 of the first and second oscillators 103 and 104, and output it as a clock signal G4 to a CPU 110. The microcomputer further comprises a random access memory (referred to as a RAM, hereinafter) 106, a read only memory (referred to as a ROM, hereinafter) 107, and a peripheral circuit 108. An I/O port 111 is also provided to transfer a signal with an external unit, and with the CPU 110 for transferring a signal with the CPU 110.

In addition, a control circuit 112 is provided to control an oscillation frequency of a clock signal inputted to the CPU 110 based on a switching signal A1 outputted therefrom The control circuit 112 outputs an oscillator control signal G1 to the first oscillator 103, where the control signal G1 is used to switch the operation of the first oscillator 103 between ON and OFF. The control circuit 112 outputs an oscillator control signal G2 to the Second oscillator 104, where the control signal G2 is used to switch the operation of the second oscillator 104 between ON and OFF. On the other hand, the clock signals G5 and G6 are inputted not only to the selector 105 but also to the control circuit 112. To the selector 105, the control circuit 112 outputs a clock selection signal G3 used to control the selection of the clock signals G5 and G6.

The power supply terminal directly supplies power supply voltage Vdd to the RAM 106, the ROM 107, the peripheral circuit 108, the CPU 110, the I/O port 111 and the control circuit 112.

In addition, a reset signal RST is inputted to each of the CPU 110 and the control circuit 112 to realize its initial state.

FIG. 2 is a timing chart showing an operation before/after the conventional single chip microcomputer is changed from a high-speed operation to a low-speed operation. In the conventional single chip microcomputer constructed in the foregoing manner, when an operating speed is changed from high-speed operation to low-speed operation, the CPU 110 transmits a high-level switching signal A1 to the control circuit 112 based on a program stored in the ROM 107. Then, upon having received the high-level switching signal A1, the control circuit 112 sets the level of an oscillator control signal G1 to be low by a specified timing. Accordingly, the operation of the first oscillator 103 is stopped. On the other hand, the level of an oscillator control signal C2 is always high, and the second oscillator 104 is in a constantly operated state. Thus, it is only the second oscillator 104 that is operated during a low-speed operation.

Therefore, in the conventional single chip microcomputer, since power consumed by the first oscillator 103 during the low-speed operation is 0, a charging/discharging current is reduced, bringing about a reduction in power consumption like that shown in FIG. 2.

However, there is a drawback inherent in such a conventional single chip microcomputer. Specifically, even if the charging/discharging current is reduced, no reduction occurs in an OFF leakage current caused to flow when a transistor in the chip is microstructured in dimension. Consequently, in a microstructuring process applied to the microcomputer requiring a high-speed operation, a leakage current component is increased, which makes it impossible to achieve low power consumption. If a requested operating speed is not so high, the OFF leakage current can be suppressed by setting high a threshold voltage Vt of the transistor, even when the transistor is microstructured. If a high-speed operation is requested, however, since a low threshold voltage Vt is necessary, power consumption during the low-speed operation is increased by the OFF leakage current when the transistor is microstructured.

Under these circumstances, regarding the microcomputer requiring the high-speed operation, one capable of reducing power consumption has been proposed (Japanese Patent Laid-open Application No. Sho. 60-10318). In the microcomputer described therein, two kinds of power supply voltages and clock signals are switched according to an operating speed, and power consumption is thereby reduced during the low-speed operation. The power supply voltages and the clock signals are simultaneously switched by a control circuit.

However, even in the conventional microcomputer described in Japanese Patent Laid-Open Application No. Sho. 60-10318, power consumption during the low-speed operation is still large, and there is a demand for a further reduction in power consumption.

SUMMARY OF THE INVENTION

It is an object of the present invention to provide a single chip microcomputer capable of reducing power consumption.

According to one aspect of the present invention, a single chip microcomputer comprises a central processing unit which stores a program executed by the central processing unit, a read only memory, a random access memory which holds data processed by the central processing unit, an oscillator which supplies a clock signal to the central processing unit, a peripheral circuit which transfers a signal to the central processing unit and receives a signal from the central processing unit, and a control circuit. The control circuit supplies a first voltage to the central processing unit, the read only memory, the random access memory and the peripheral circuit in synchronization with rising/falling of the clock signal. The control circuit supplies a second voltage to the central processing unit with passage of predetermined time after the rising/falling of the clock signal. The first voltage enables the central processing unit, the read only memory, the random access memory and the peripheral circuit to change their operations. The second voltage is lower than the first voltage, and enables the central processing unit, the read only memory, the random access memory and the peripheral circuit to maintain their operations.

According to the aspect of the present invention, a voltage supplied to each of the central processing unit, the read only memory, the random access memory and the peripheral circuit is set equal to one for enabling the respective units and circuits to be operated in synchronization with rising/falling of the clock signal. In other words, a voltage is set for enabling the respective units and circuits to change their operations. In addition, with passage of predetermined time after the rising/falling of the Clock signal, a voltage is reduced to one for enabling the respective units and circuits to maintain their operations. Accordingly, leakage current is reduced while the stable operation of each circuit is maintained. As a result, power consumption is reduced. Especially, when two kinds of high-speed and low-speed clock signals are used, a reduction in power consumption is considerable if the foregoing control is applied during a low-speed clock operation. Further, by limiting a circuit to receive the supply of a voltage for a fixed period to the RAM or its partial area, power consumption can be further reduced.

According to another aspect of the present invention, a single chip microcomputer comprises a central processing unit, a read only memory which stores a program executed by the central processing unit, a random access memory which holds data processed by the central processing unit, a first oscillator which supplies a first clock signal to the central processing unit, a second oscillator which supplies a second clock signal having a frequency lower than that of the first clock signal to the central processing units a clock selector which selects and supplies any one of the first and second clock signals to the central processing unit, and a peripheral circuit which transfers a signal to the central processing unit and receives a signal from the central processing unit. The single chip microcomputer further comprises a first step-down circuit which steps down a power supply voltage supplied to a power supply terminal to a first voltage, a second step-down circuit which steps down the power supply voltage to a second voltage, and a control circuit. The first voltage enables the central processing unit, the read only memory, the random access memory and the peripheral circuit to be operated with the second clock signal. The second voltage is lower than the first voltage and enables the central processing unit, the read only memory, the random access memory and the peripheral circuit to maintain their operations. The control circuit controls voltage supplied to the central processing unit, the read only memory, the random access memory and the peripheral circuit, and controls a clock signal supplied to the central processing unit in relation to the first and second clock signals.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 15 is a flowchart showing an operation of the single chip microcomputer of the second embodiment.

DETAILED DESCRIPTION OF THE PREFERRED EMBODIMENT

The preferred embodiments of the present invention will be described in detail with reference to the accompanying drawings.

Figure 1:
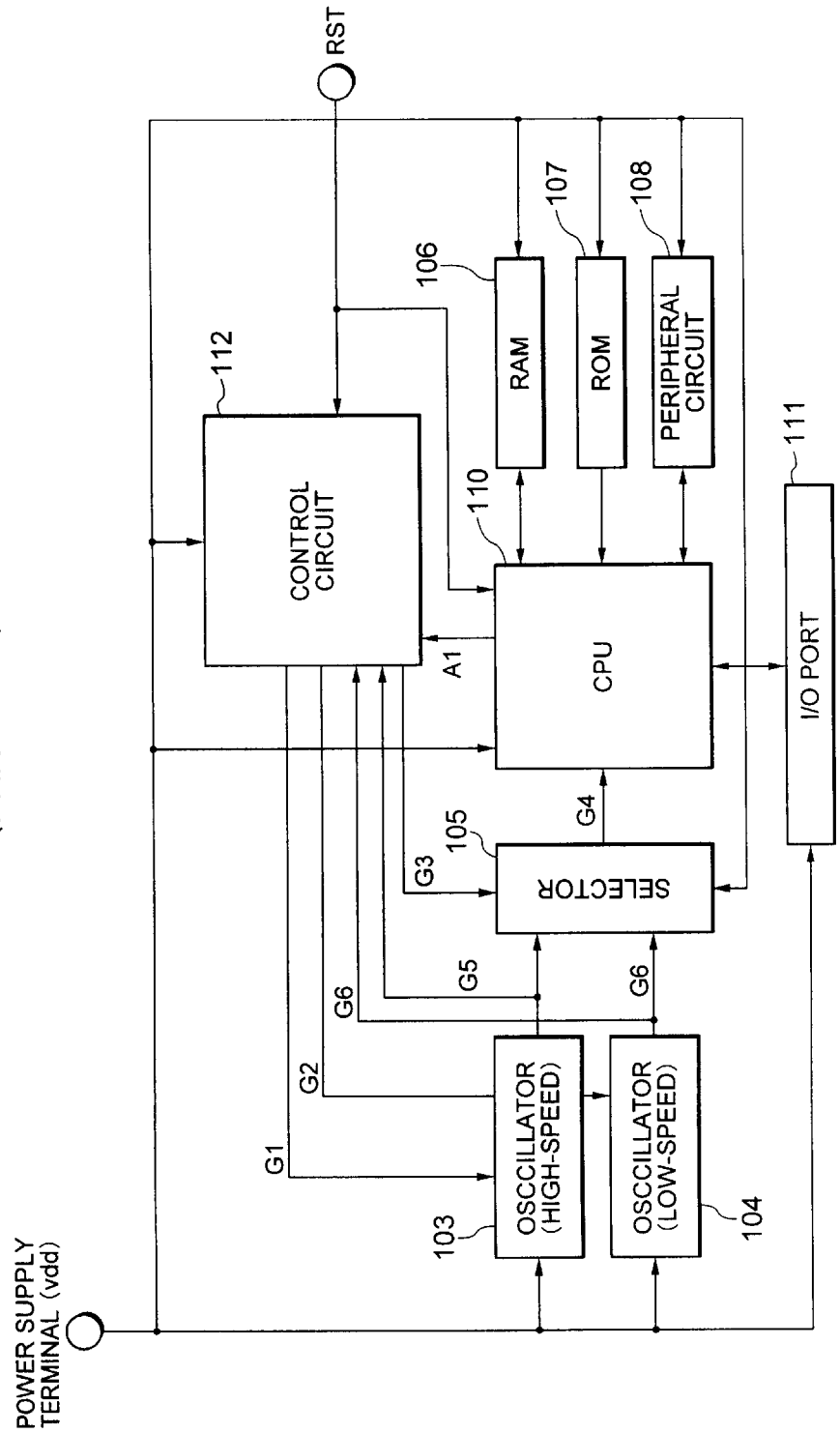
FIG. 1 is a block diagram showing a constitution of a conventional single chip microcomputer.
Figure 2:
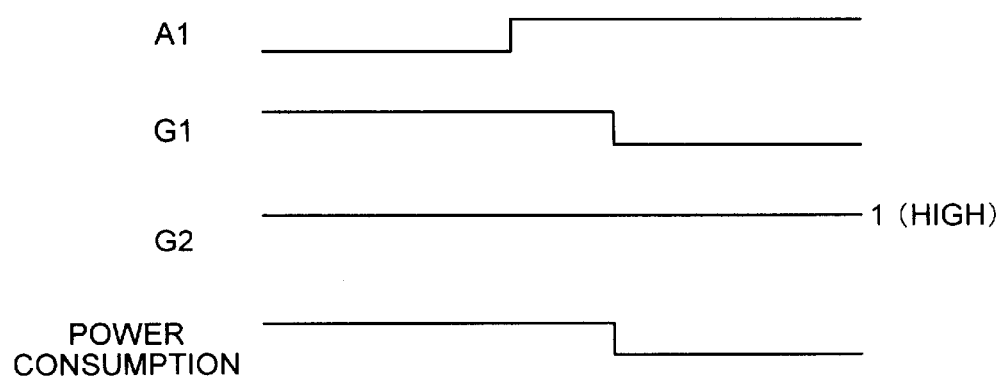
FIG. 2 is a ting chart showing an operation before/after the conventional single chip microcomputer is changed from a high-speed operation to a low-speed operation.
Figure 3:
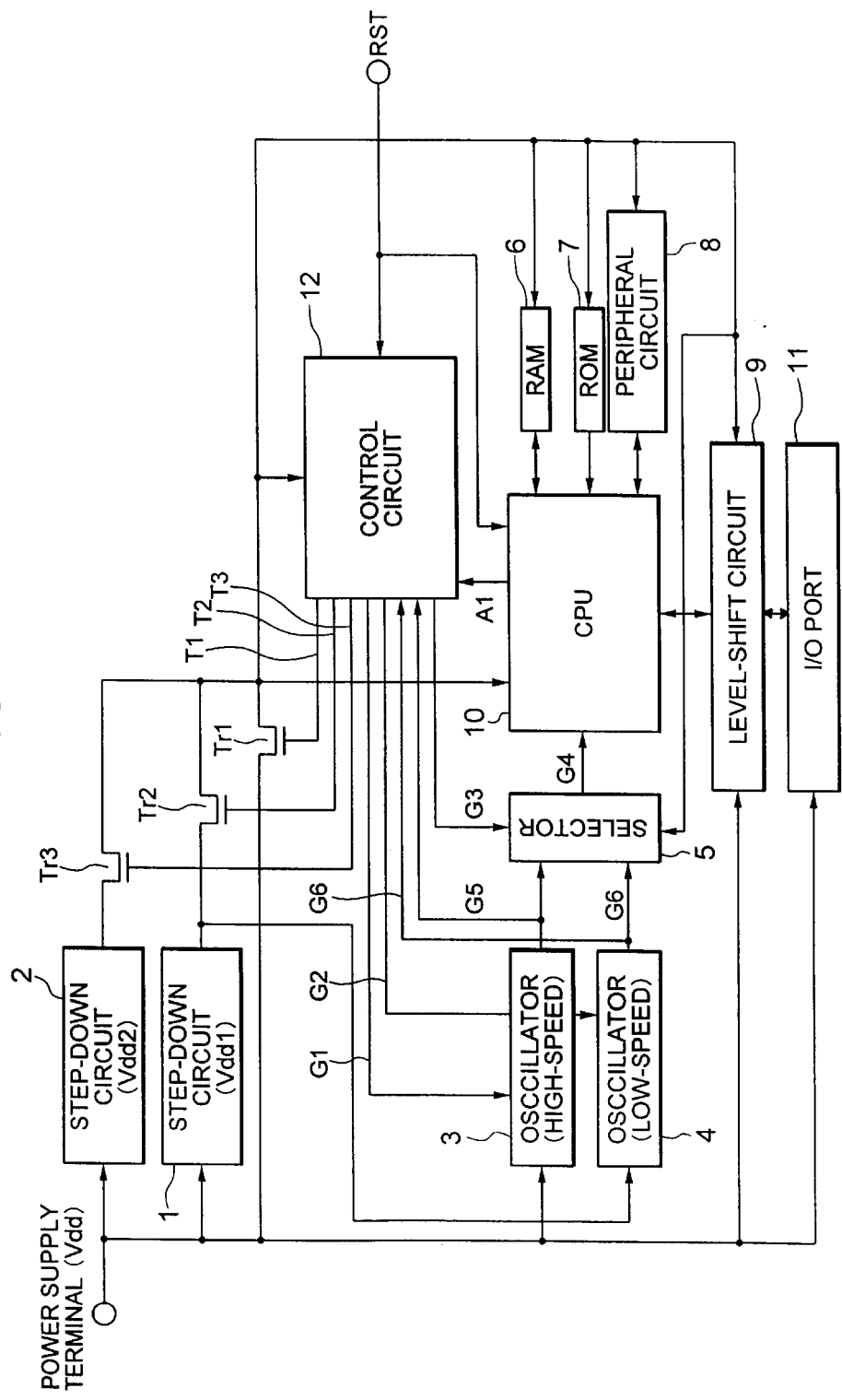
FIG. 3 is a block diagram showing a structure of a single chip microcomputer according to a first embodiment of the present invention.

FIG. 3 is a block diagram showing the structure of a single chip microcomputer according to a first embodiment of the present invention.

In the first embodiment, first and second step-down circuits 1 and 2 are provided to supply voltages to a CPU 10. From a power supply terminal a power supply voltage Vdd is supplied to each of the first and second step-down circuits 1 and 2. The first step-down circuit 1 steps down the power supply voltage Vdd to a voltage Vdd1 and then outputs it. The second step-down circuit 2 steps down the power supply voltage Vdd to a voltage Vdd2 and then outputs it. The voltage Vdd1 is larger than the voltage Vdd2. For example, the power supply voltage Vdd is set at 3.3V; the voltage Vdd1 at 2V; and the voltage Vdd2 at 1V. According to the present invention, however, voltages should not be limited to these, and any levels may be set as long as the voltage Vdd1 is equal to or higher than a voltage for enabling a circuit operated by a low-speed clock signal to start its operation, and the voltage Vdd2 is equal to or higher than a voltage for enabling the circuit operated by the low-speed clock signal to hold its operating state The single chip microcomputer of the first embodiment comprises a first oscillator 3, to which the power supply voltage Vdd is supplied from the power supply terminal, and a second oscillator 4, to which the voltage Vdd1 is supplied from the first step-down circuit 1. An oscillation frequency of the first oscillator 3 is set larger than that of the second oscillator 4. In other words, the first oscillator 3 is designed for a high-speed clock signal, while the second oscillator 4 is designed for a low-speed clock signal. For example, the oscillation frequency of the first oscillator 3 is set at 20 MHz; and that of the second oscillator 4 at 32 kHz. According to the present invention, however, oscillation frequencies should not be limited to these.

In addition, the single chip microcomputer comprises a selector 5 which is provided to select each of the clock signals G5 and G6 of the first and second oscillators 3 and 4, and output it as a clock signal G4 to the CPU 10. The single chip microcomputer also comprises a RAM 6, a peripheral circuit 8, a level-shift circuit 9, which are provided to transfer/receive a signal to/from the CPU 10, and a ROM 7 provided to store a program executed by the CPU 10. An I/O port 11 is also provided to transfer/receive a signal to/from an external unit, and to/from the level-shift circuit 9.

Further, the single chip microcomputer according to the first embodiment comprises a control circuit 12 for controlling a voltage supplied to the CPU 10 and an oscillation frequency based on a switching signal A1 outputted from the CPU 10. A field effect transistor Tr1 is connected between the control circuit 12 and the power supply terminal; a transistor Tr2 between the CPU 10 and the first step-down circuit 1; and a transistor Tr3 between the CPU 10 and the second step-down circuit 2. To the gates of these transistors Tr1, Tr2, and Tr3, voltage selection signals T1, T2 and T3 are respectively outputted from the control circuit 12. The transistors Tr1 to Tr3 may be all P-channel transistors The control circuit 12 outputs an oscillator control signal G1 to the first oscillator 3, the control signal G1 being used to switch its operation between ON and OFF, and an oscillator control signal G2 to the second oscillator 4, the control signal G2 being used to switch its operation between ON and OFF. On the other hand, the clock signals G5 and G6 are inputted not only to the selector 5 but also to the control circuit 12. Further, to the selector 5, the control circuit 12 outputs a clock selection signal G3 to control the selection of the clock signals G5 and G6.

Power supply voltages Vdd are directly supplied to the level-shift circuit 9 and the I/O port 11 from the power supply terminal. Any of the power supply voltage Vdd, the voltage Vdd2 and the voltage Vdd1 are supplied through the transistors Tr1 to Tr3 to the RAM 6, the ROM 7, the peripheral circuit 8 and the selector 5. A voltage is also supplied through each of the transistors Tr1 to Tr3 to the level-shift circuit 9

Figure 4:
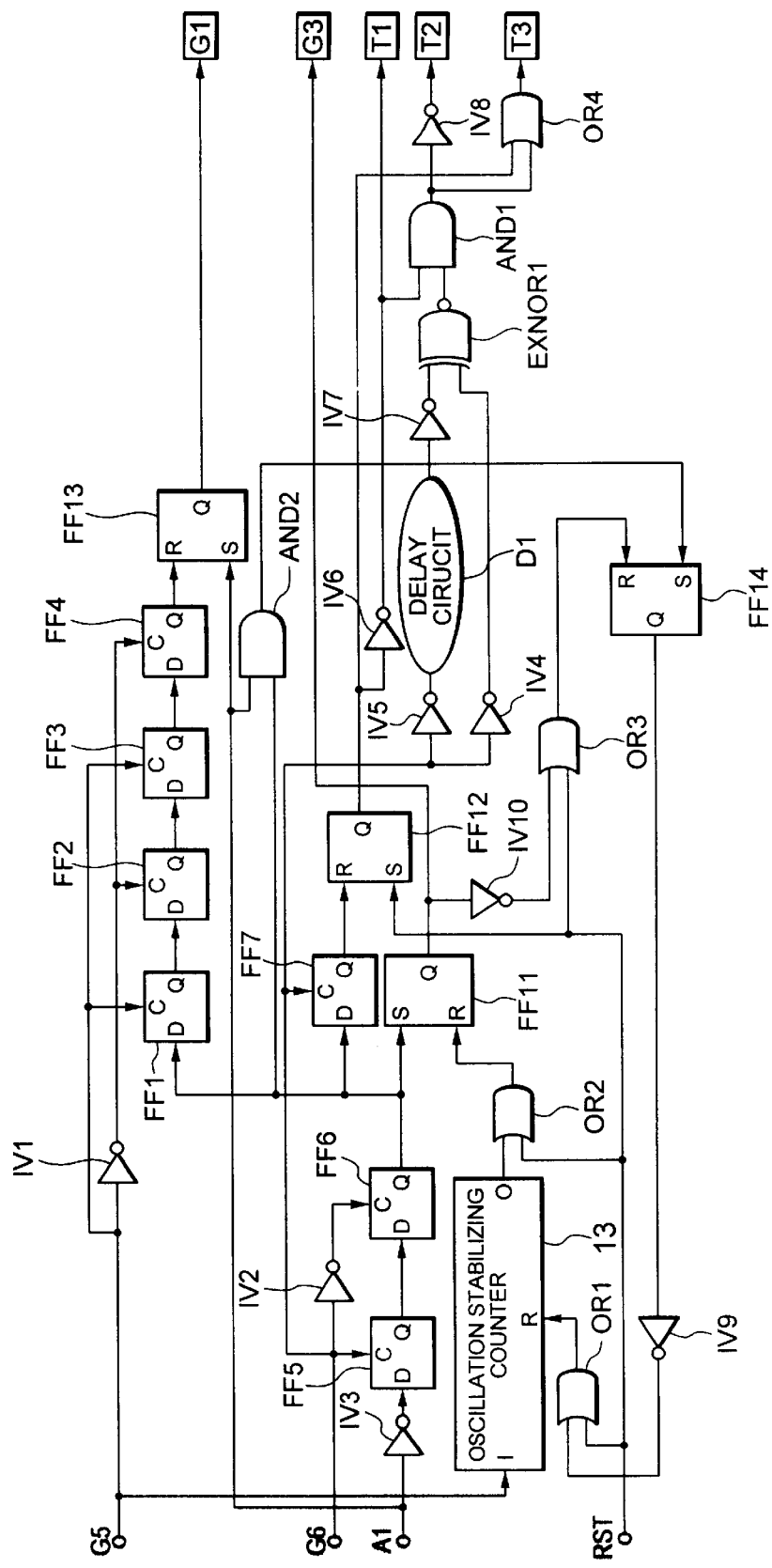
FIG. 4 is a block diagram showing a structure of a control circuit 12 in the first embodiment.

In addition, a reset signal RST is inputted to each of the CPU 10 and the control circuit 12 to realize its initial state FIG. 4 is a block diagram showing a structure of the control circuit 12 of the first embodiment.

The control circuit 12 includes flip-flops FF1 and FF3, the clock signal G5 being inputted to the C terminals thereof, and an inverter IV1, the clock signal C5 being inputted to the input terminal thereof. Flip-flops FF2 and FF4, whose C terminals are connected to the output terminal of the inverter IV1 are provided. The Q terminal of the flip-flop FF1 is connected to the D terminal of the flop-flop FF2; the Q terminal of the flip-flop FF2 is connected to the D terminal of the flip-flop FF3; and the Q terminal of the flip-flop FF3 is connected to the D terminal of the flip-flop FF4.

The control circuit 12 also includes flip-flops FF5 and FF7, the clock signal G6 being inputted to the C terminals thereof, and an inverter IV3, to which a switching signal A1 is inputted. The D terminal of the flip-flop FF5 is connected to the output terminal of the inverter IV3. The control circuit 12 also includes an inverter IV3, the clock signal G6 being inputted to the input terminal thereof, and a flip-flop FF6, whose C terminal is connected to the output terminal of the inverter IV2 and whose D terminal is connected to the Q terminal of the flip-flop FF5. The Q terminal of the flip-flop FF6 is connected to the D terminals of the flip-flops FF1 and FF7.

In addition, a flip-flop FF13 is provided, the switching signal A1 being inputted to the S terminal thereof, and the R terminal thereof being connected to the Q terminal of the flip-flop FF4. A signal outputted from the Q terminal of the flip-flop FF13 is an oscillator control signal G1. A two-input AND gate AND2 is also provided, to which the switching signal A1 and the output signal of the flip-flop FF6 are entered. A flip-flop FF14 is provided, the output signal of the AND gate AND2 being inputted to the S terminal thereof. An inverter IV9 is provided, whose input terminal is connected to the Q terminal of the flip-flop FF14. A two-input OR gate OR1 is provided, one input terminal thereof being connected to the output terminal of the inverter IV9, and the reset signal RST being inputted to the other input terminal thereof. An oscillation stabilizing counter 13 is provided, the clock signal G5 being inputted to the input terminal I thereof, and the output terminal of the OR gate OR1 being connected to the reset terminal R thereof. This oscillation stabilizing counter 13 contains the preset number of pulses from the rising of the clock signal G5 to its stabilization. After input of the output signal of the OR gate OR1 to the reset terminal R, the number of pulses therefor is counted.

The control circuit 12 further includes a two-input OR gate OR2, whose input terminals are connected to the output terminal of the OR gate OR1 and the output terminal O of the oscillation stabilizing counter 13. A flip-flop FF11 is provided, whose R terminal is connected to the output terminal of the OR gate OR2, and whose S terminal is connected to the Q terminal of the flip-flop FF6. A signal outputted from the flip-flop FF11 is a clock selection signal G3. Further, an inverter IV10 is provided to invert the output signal of the flip-flop FF11, and a two-input OR gate OR3 is provided to input the output signal of the inverter IV10 and the reset signal RST. The output terminal of the OR gate OR3 is connected to the R terminal of the flip-flop FF14.

In addition, a flip-flop FF12 is provided, to whose S terminal the reset signal RST is inputted, and whose R terminal is connected to the Q terminal of the flip-flip FF7. A signal outputted from the Q terminal of the flip-flop FF12 is a voltage selection signal T1.

The control circuit 12 also includes inverters IV4 and IV5, to which the switching signal A1 is inputted, and an inverter IV6 connected to the Q terminal of the flip-flop FF12. A delay circuit D1 having delay time t1 and an inverter IV7 are connected in series to the output terminal of the inverter IV5. A two-input exclusive NOR gate EXNOR1 is provided, whose input terminal is connected to the output terminal of each of the inverters IV4 and IV7. A two-input AND gate AND1 is provided, whose input terminal is connected to the output terminal of each of the exclusive NOR gate EXNOR1 and the inverter IV7. The output signal of the exclusive NOR gate EXNOR1 is inputted to an inverter IV8. The output signal of the inverter IV8 is a voltage selection signal T2. An OR gate OR4 is also provided, whose input terminal is connected to the AND gate AND1 and the Q terminal of the flip-flop FF12. The output signal of this OR gate OR4 is a voltage selection signal T3.

Furthermore, the control circuit 12 includes a circuit provided to output an oscillator control signal G2. According to the described embodiment, while the single chip microcomputer itself is in an operating state, the oscillator control signal G2 is always at a high level, requiring no special control Thus, explanation thereof will be omitted.

Figure 5:
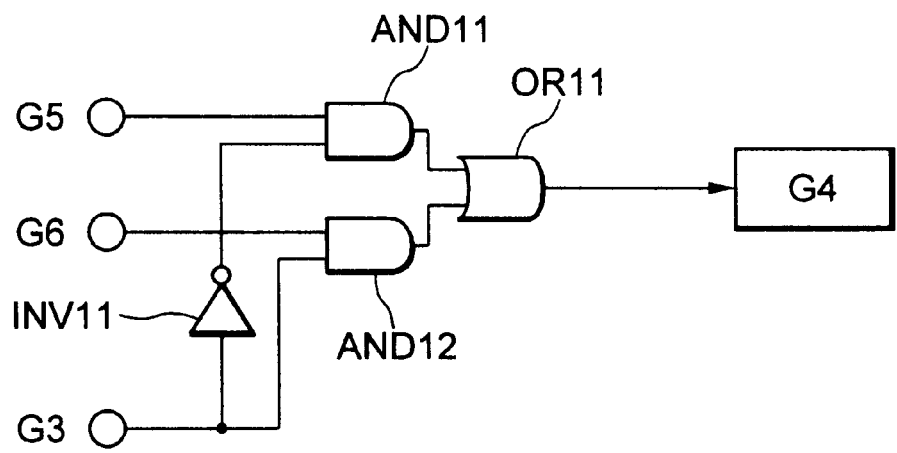
FIG. 5 is a block diagram showing a structure of a selector in the first embodiment.

FIG. 5 is a block diagram showing the constitution of the selector 5 of the first embodiment.

The selector 5 includes an inverter IV11 for inverting the clock selection signal G3, a two-input AND gate AND11, to which the output signal of the inverter IV11 and the clock signal G5 are inputted, and a two-input AND gate AND12, to which the clock signals G3 and G6 are inputted. In addition, an OR gate OR11 is provided, to which the output signals of the AND gates AND11 and AND12 are inputted. The output signal of the OR gate OR11 is a clock signal G4.

Figure 6:
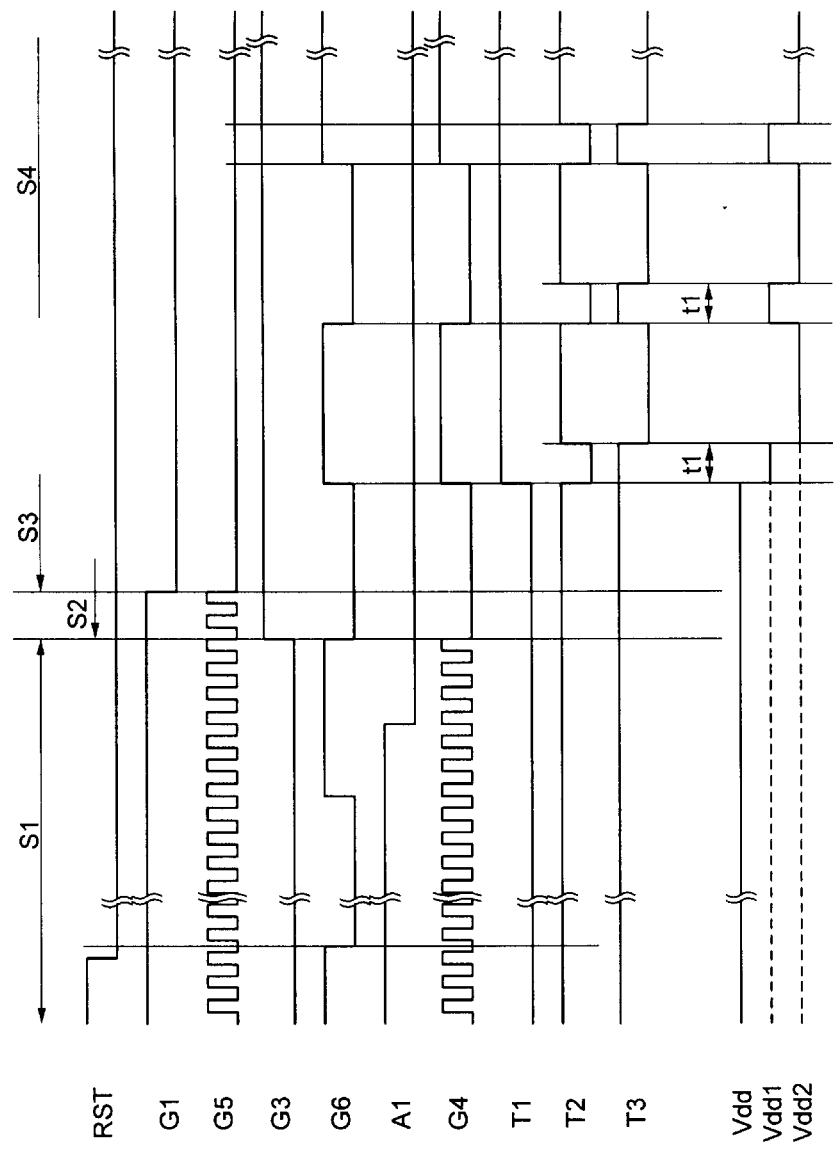
FIG. 6 is a timing chart showing an operation before/after a nigh-speed operation is changed to a low-speed operation according to the first embodiment.
Figure 7:
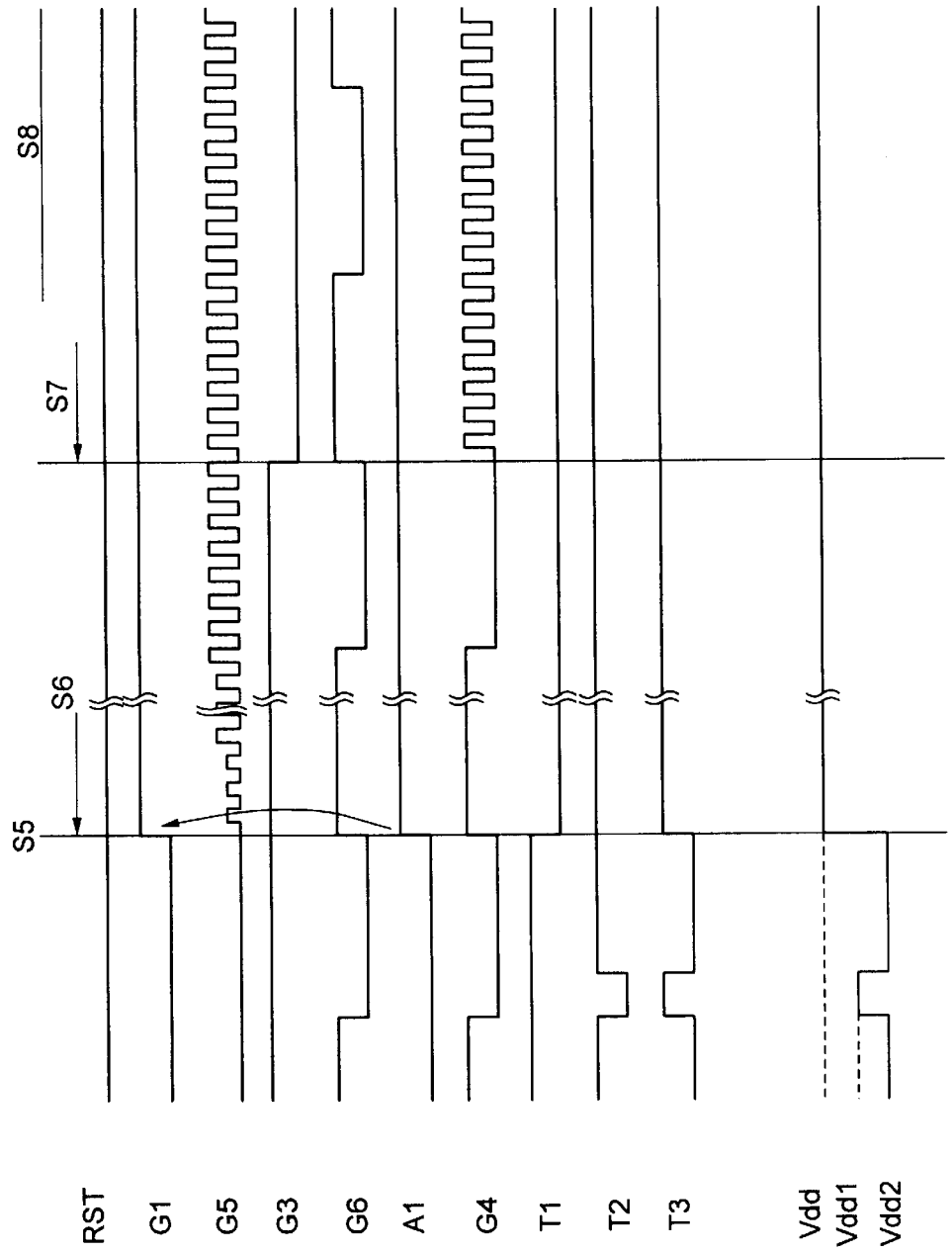
FIG. 7 is a timing chart showing an operation before/after a low-speed operation is changed to a high-speed operation according to the first embodiment.
Figure 8:
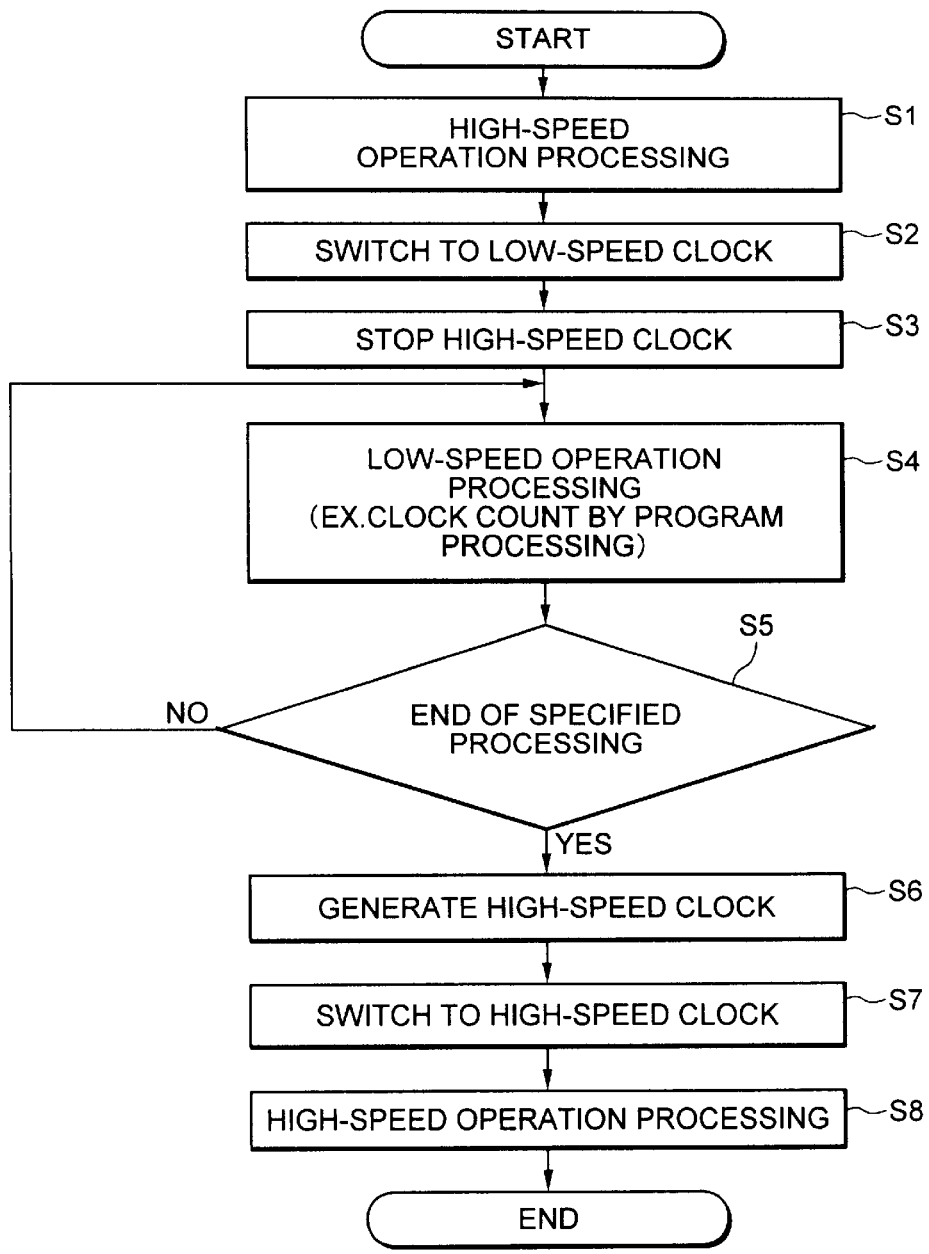
FIG. 8 is a flowchart showing an operation of the single chip microcomputer of the first embodiment.

Next, description will be made of the operation of the single chip microcomputer according to the first embodiment constructed in the foregoing manner. FIG. 6 is a timing chart showing an operation before/after a high-speed operation is changed to a low-speed operation in the first embodiment; FIG. 7 a timing chart showing an operation before/after a low-speed operation is changed to a high-speed operation in the first embodiment; and FIG. 8 a flowchart showing the operation of the single chip microcomputer according to the first embodiment When the reset signal RST to the CPU 10 and the control circuit 12 is released, as shown in FIG. 6, the single chip microcomputer itself starts its normal operation (step S1). In this normal operation, the level of the oscillator control signal G1 is high, and the first and second oscillators 3 and 4 are in operating states. The level of the clock selection signal G3 is low, and the selector 5 selects the high-speed clock signal G5 and supplies it as the clock signal G4 to the CPU 10. On the other hand, although the level of the voltage selection signal T1 is low, the levels of the voltage selection signals T2 and T3 ore high, and power supply voltages Vdd are supplied to the CPU 10, the control circuit 12, the RAM 6, the ROM 7 and the peripheral circuit 8. Accordingly, the normal operation is carried out by a high-speed clock.

when an operation is changed from the normal operation to a low-speed operation, the CPU 10 lowers the switching signal A1 based on the program stored in the ROM 7. Upon receiving this signal, the control circuit 12 raises the clock selection signal G3 in synchronization with the next falling of the low-speed clock signal G6. Then, the selector 5 selects the low-speed selection signal G6, and supplies it as the clock signal G4 to the CPU 10 (step S2).

Subsequently, the control circuit 12 counts the high-speed clock signal G5 equivalent to two clocks, and then lowers the oscillator control signal G1. In this way, the operation of the first oscillator 3 is stopped (step S3). The control circuit 12 raises the voltage selection signal T1 and lowers the voltage selection signal T2 in synchronization with the next rising of the control signal G6 after the rising of the clock selection signal G3 as described above. Accordingly, a voltage supplied to the CPU 10, the control circuit 12 or the like is lowered from the power supply voltage Vdd to the voltage Vdd1, which is lower.

With the passage of time t1 after the rising of the voltage selection signal T1 and the falling of the voltage selection signal T2, the control circuit 12 raises the voltage selection signal T2, and lowers the voltage selection signal T3. In this way, a voltage supplied to the CPU 10, the control circuit 12 or the like is lowered from the voltage Vdd1 to the lower voltage Vdd2.

Subsequently, the control circuit 12 raises the voltage selection signal T3 and lowers the voltage selection signal T2 in synchronization with the falling of the control signal G6. Accordingly, a voltage supplied to the CPU 10, the control circuit 12 or the like is increased from the voltage Vdd2 to the voltage Vdd1.

With the passage of time t1 after the rising of the voltage selection signal T3 and the falling of the voltage selection signal T2, the control circuit 12 raises the voltage selection signal T2, and lowers the voltage selection signal T3. Thus, a voltage supplied to the CPU 10, the control Circuit 12 or the like is lowered from the voltage Vdd1 to the voltage Vdd2.

Then, during the low-speed operation, the control circuit 12 carries out control for the voltage selection signals T2 and T3 in synchronization with the rising/falling of the low-speed clock signal G6 like that described above (step S4).

Specified processing in the low-speed operation is finished (step S5), and when an operation is changed from the low-speed operation to the normal operation, as shown in FIG. 7, the CPU 10 raises the switching signal A1 in synchronization with any rising of the clock signal G4 based on the program stored in the ROM 7. In synchronization therewith, the control circuit 12 sets high the level of the oscillator control signal G1. Accordingly, the first oscillator 3 starts its operation (step S6), and the high-clock signal C5 is supplied to the selector 5.

Then, the control circuit 12 lowers the control signal G3 in synchronization with the rising of the control signal G6. Accordingly, the selector 5 selects the high-speed clock signal C5, and supplies it as the clock signal G4 to the CPU 10 (step S7).

Subsequently, the normal operation is carried out at a high speed (step S8).

As described above, according to the first embodiment, the voltage supplied to the CPU 10, the control circuit 12 and the like during the low-speed operation becomes a low voltage Vdd1 when the low-speed clock signal G6 rises/falls and, then, with the passage of time t1, the voltage becomes a lower voltage Vdd2. Therefore, a leakage current can be reduced while the circuit operated by the low-speed clock signal G6 is kept in a stable operating state.

It can therefore be understood that even if a fine process is applied to the single chip microprocessor for a high-speed operation, since a channel leakage current can be considerably reduced during the low-speed operation, power consumption during the low-speed operation can be greatly reduced.

The first embodiment is for the microcomputer, which needs a high-speed clock signal of, e.g., 20 MHz, and a low-speed clock signal of, e.g., 32 kHz. However, the embodiment can be applied to one, such as a gas meter, a water meter or the like, which needs no high-speed clock signals In this case, an arrangement may be made such that excluding the first oscillator 3 for generating a high-speed clock signal and a device or the like related to its operation, a voltage is supplied for enabling a device provided to, for example, CPU to start its operation in synchronization with rising/falling of the low-speed clock signal, and in the other period, a supplied voltage is reduced to a level for enabling the device to hold its operating state.

Figure 9:
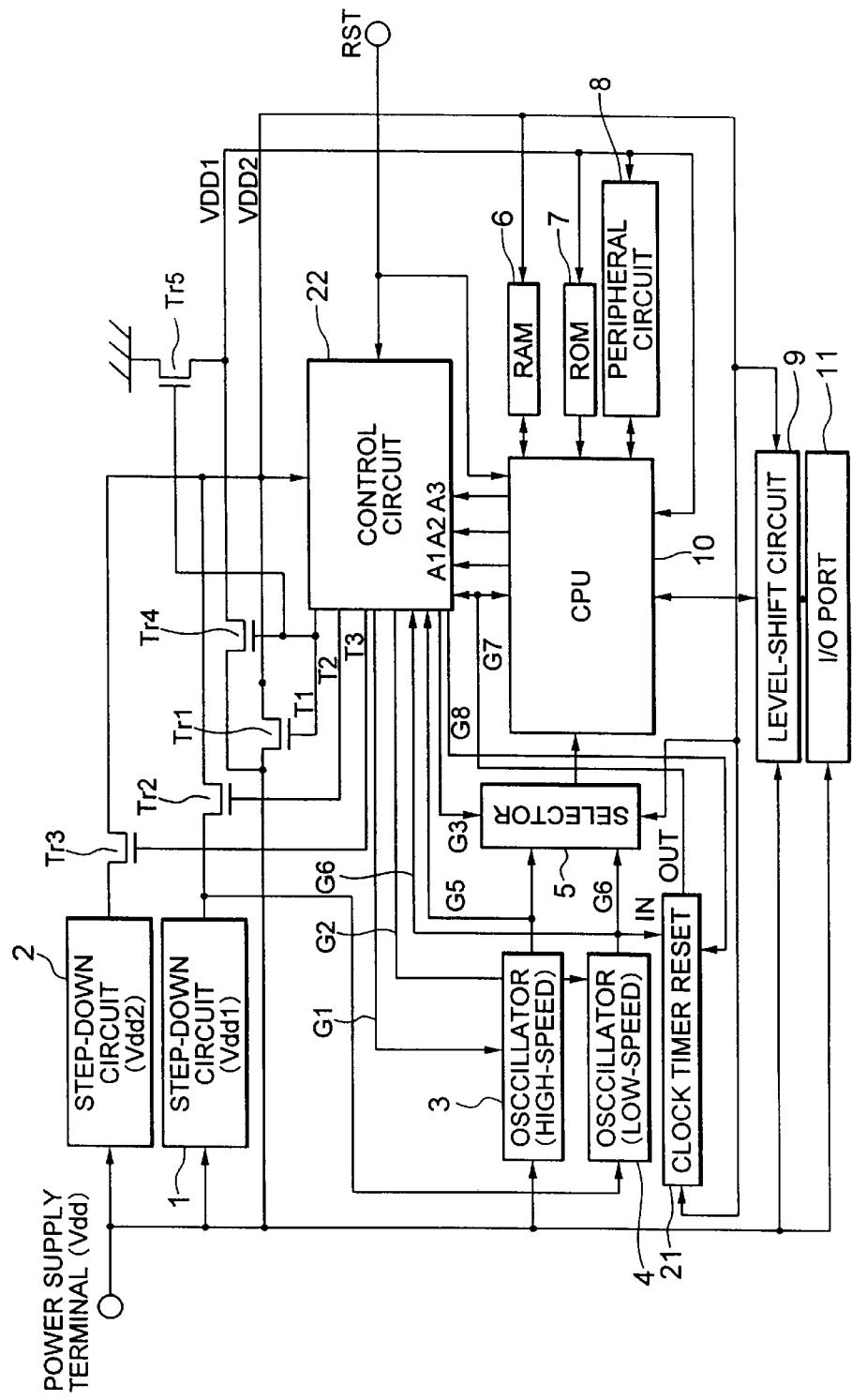
FIG. 9 is a block diagram showing a structure of a single chip microcomputer according to a second embodiment of the present invention.

Next, a second embodiment of the present invention will be described. According to the second embodiment, a clock timer is provided. The second embodiment is designed to stop the supply of power to a circuit other than one necessary for maintaining the operation of the clock timer during the low-speed operation. FIG. 9 is a block diagram showing the structure of a single chip microcomputer according to the second embodiment of the present invention. In the second embodiment shown in FIG. 9, components like those of the first embodiment shown in FIG. 3 are denoted by like reference numerals, and specific explanation thereof will be omitted.

In the second embodiment, there is provided a clock timer 21, which is operated in synchronization with a clock signal G6 outputted from the second oscillator 4. To the clock timer 21, a voltage VDD2 at a common connection point of the transistors Tr1 to Tr3 is supplied. The voltage VDD2 is also supplied to the RAM 6, the level-shirt circuit 9 and the selector 5.

In the second embodiment, a transistor Tr4 is provided, having one end connected to the power supply terminal; and a transistor Tr5, having one end connected to the other end of the transistor Tr4. The other end of the transistor Tr5 is grounded. A voltage VDD1 at a common connection point of the transistors Tr4 and Tr5 is supplied to the ROM 7, the peripheral circuit 8 and the CPU 10. The transistors Tr1 to Tr4 may be all P-channel transistors, whereas the transistor Tr5 may be an N-channel transistor.

In addition to a switching signal A1, an operation instruction signal A2 and a rewriting completion signal A3 are outputted from the CPU 10 to a control circuit 22. An operation start signal G8 is outputted from the control circuit 22 to the clock timer 21.

Figure 10:
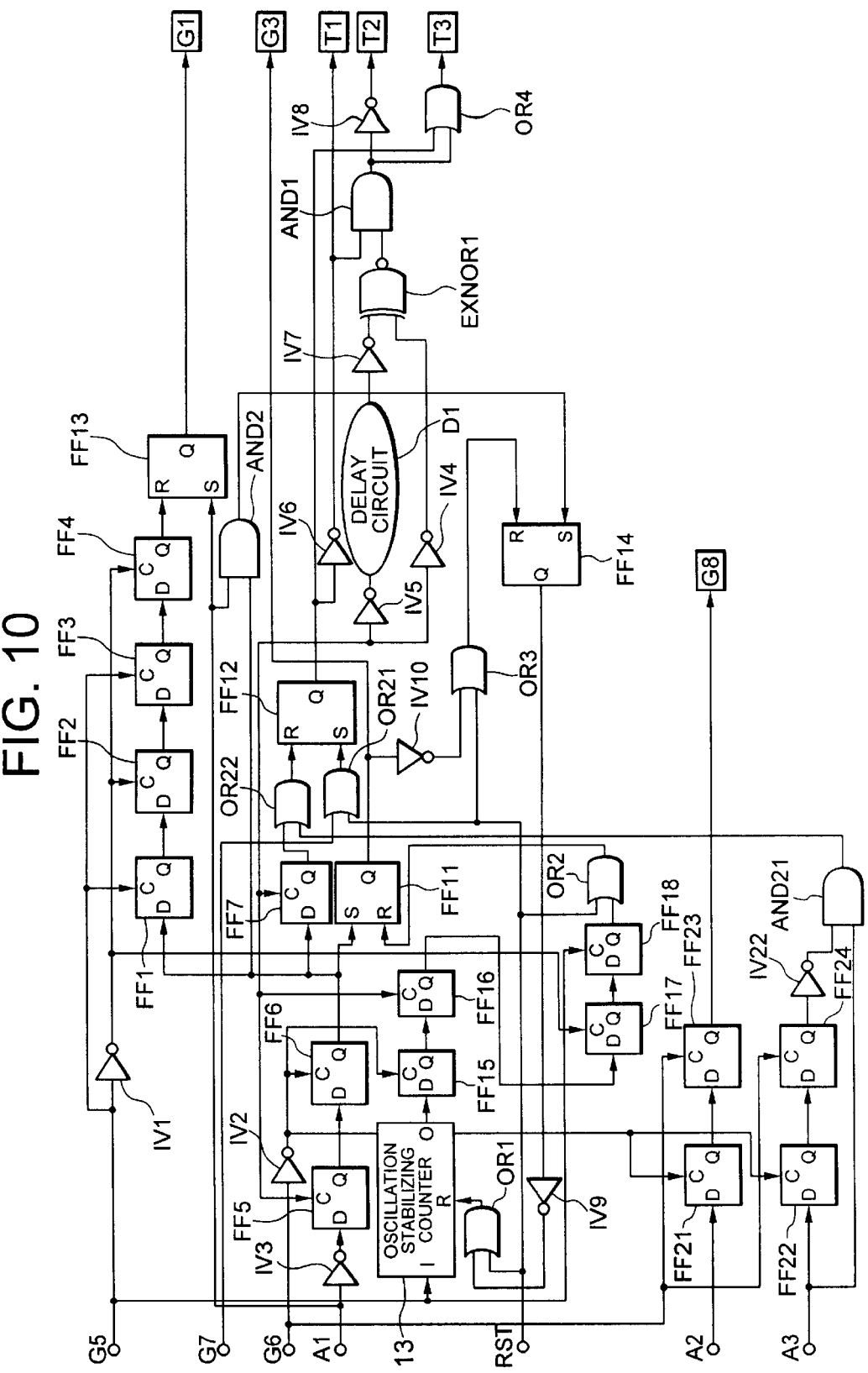
FIG. 10 is a block diagram showing a structure of a control circuit 22 in tne second embodiment.

FIG. 10 is a block diagram showing a structure of the control circuit 22 in the second embodiment. In the control circuit 22 shown in FIG. 10, components like those of the control circuit 12 shown in FIG. 4 are denoted by like reference numerals, and specific explanation thereof will be omitted.

A flip-flop FF21, FF22, FF23 and FF24 are provided to the control circuit 22. The operation instruction signal A2 is inputted to the D terminal of the flip-flop FF21, and the output signal of the inverter IV2 is inputted to the C terminal of the flip-flop FF21. The rewriting completion signal A3 is inputted to the D terminal of the flip-flop FF22, and the output signal of the inverter IV2 is inputted to the C terminal of the flip-flop FF22. The output signal of the flip-flop FF21 is inputted to the D terminal of the flip-flop FF23, and a clock signal G6 is inputted to the C terminal of the flip-flop FF23. The output signal of the flip-flop FF22 is inputted to the D terminal of the flip-flop FF24, and the clock signal G6 is inputted to the C terminal of the flip-flop FF24 The output signal of the flip-flop FF23 is an operation start signal G8.

The control circuit 22 also includes an inverter IV22 for inverting the output signal of the flip-flop FF24, and a two-input AND gate AND21 for operating logical AND of the rewriting completion signal A3 and the output signal of the inverter IV22. The control circuit 22 further includes a two-input OR gate OR21 provided for operating logical OR of a clock timer overflow signal (referred to as an OVF signal, hereinafter) G7 from the clock timer 21 and a reset signal RST, and outputting its result to the S terminal of the flip-flop FF12. The control circuit 22 further includes a two-input OR gate OR22 provided for operating logical OR of the output signal of the flip-flop FF7 and the output signal of the AND gate AND21, and outputting its result to the R terminal of the flip-flop FF12.

Furthermore, four flip-flops FF15 to FF18 are connected in series between the output terminal of the oscillation stabilizing counter 13 and the OR gate OR2. The output signal of the inverter IV2 is inputted to the C terminal of the flip-flop FF15. The clock signal G6 is inputted to the C terminal of the flip-flop FF16. The output signal of the inverter IV1 is inputted to the C terminal of the flip-flop FF17. The clock signal G5 is inputted to the C terminal of the flip-flop FF18.

Figure 11:
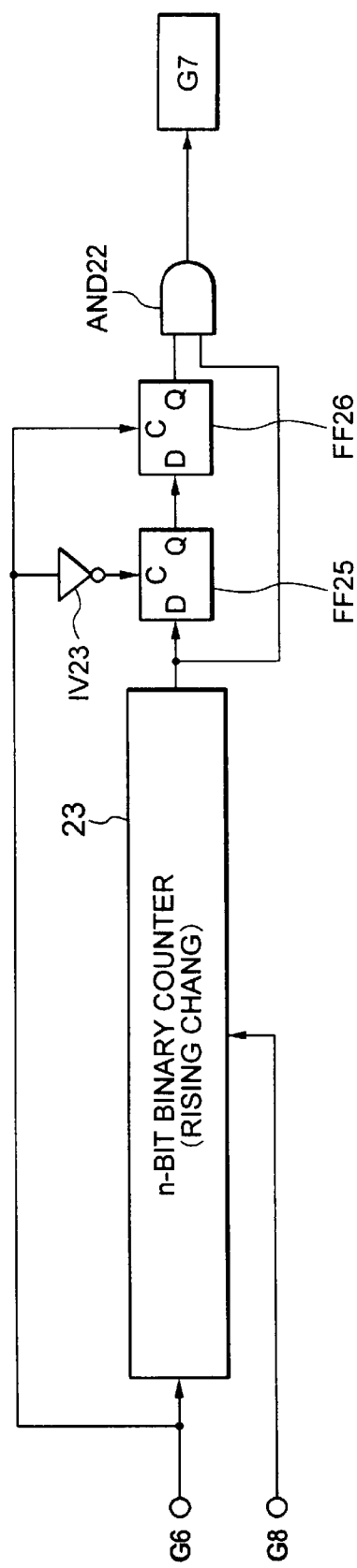
FIG. 11 is a block diagram showing a structure of a clock timer 21 in the second embodiment.

FIG. 11 is a block diagram snowing a structure of the clock timer 21 of the second embodiment.

The clock timer 21 includes an n-bit binary counter 23 actuated by the operation start signal G5 to count the number of changes in the rising of the clock signal G6, and an inverter IV23 for inverting the clock signal G6. The clock timer 21 also includes a flip-flop FF25, a flip-flop FF26 and a two-input AND gate AND22. The output signal of the n-bit binary counter 23 is inputted to the D terminal of the flip-flop FF25, and the output signal of the inverter IV23 is inputted to the C terminal of the flip-flop FF25. The output signal of the flip-flop FF25 is inputted to the D terminal of the flip-flop FF26, and the clock signal G6 is inputted to the C terminal of the flip-flop FF26. Logical AND of the output signal of the flip-flop FF26 and the output signal of the n-bit binary counter 23 is operated by the two-input AND gate AND22. The output signal of the AND gate AND22 is an OVF signal G7.

Figure 12:
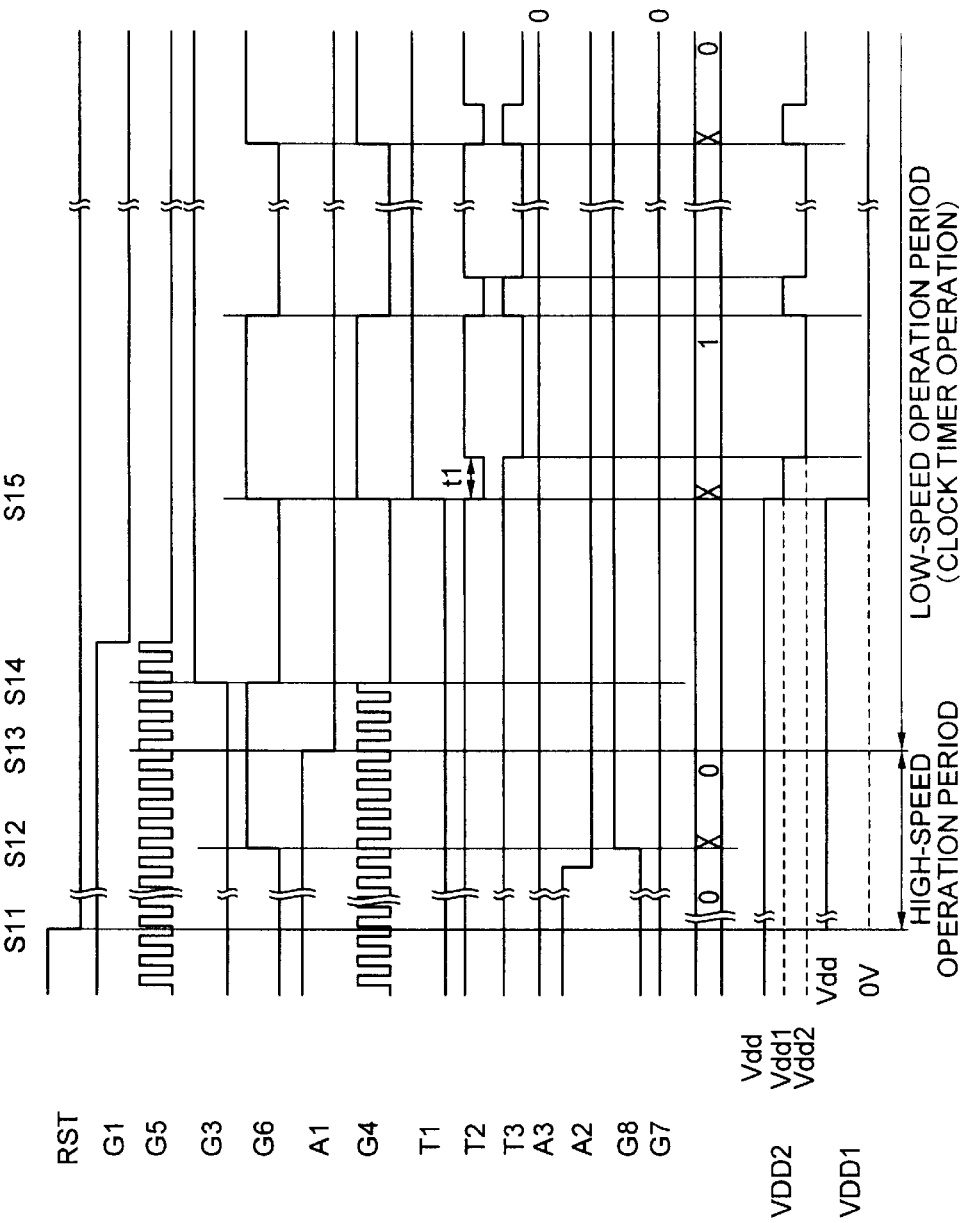
FIG. 12 is a timing chart showing an operation before/after a high-speed operation is changed to a low-speed operation according to the second embodiment.
Figure 13:
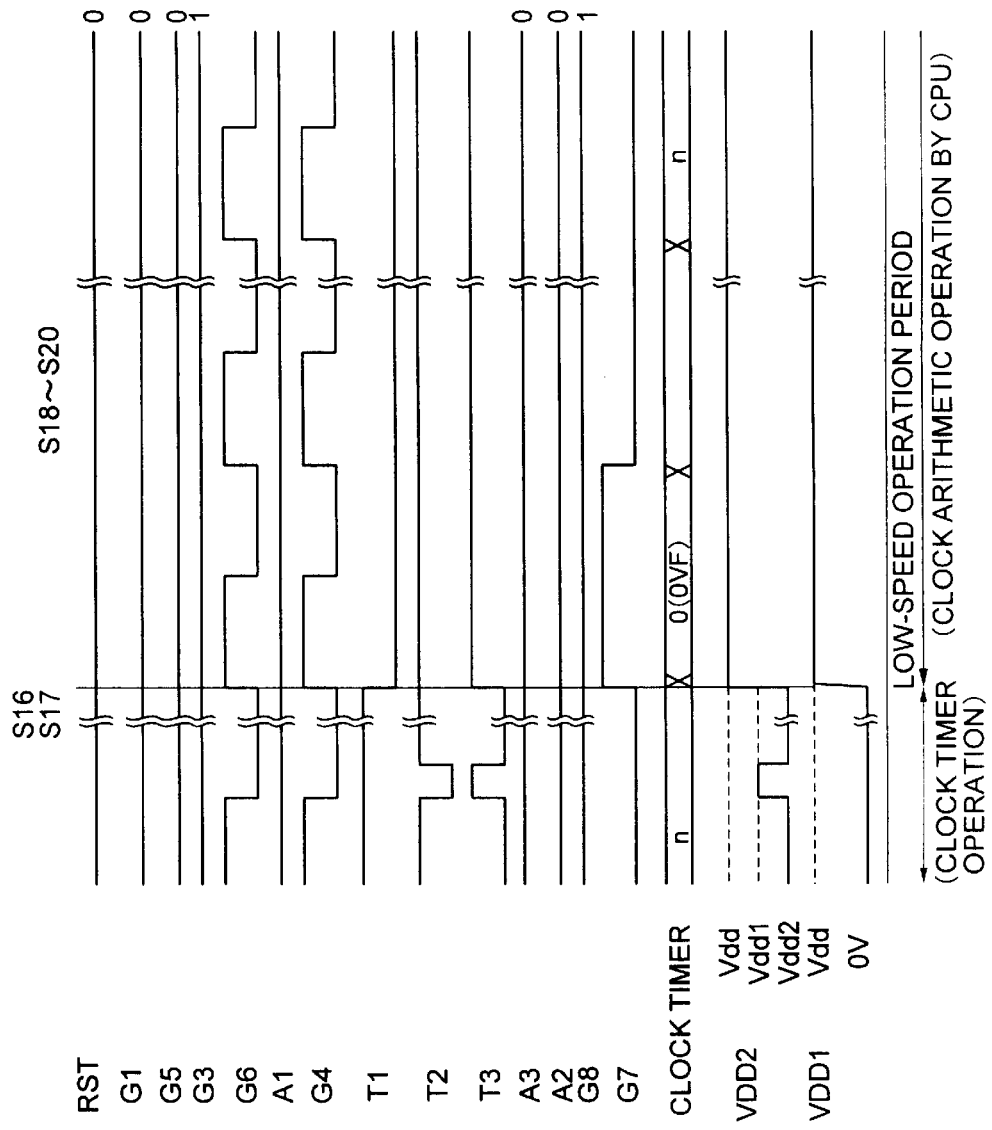
FIG. 13 is a timing chart showing an operation during a low-speed operation period according to the second embodiment.
Figure 14:
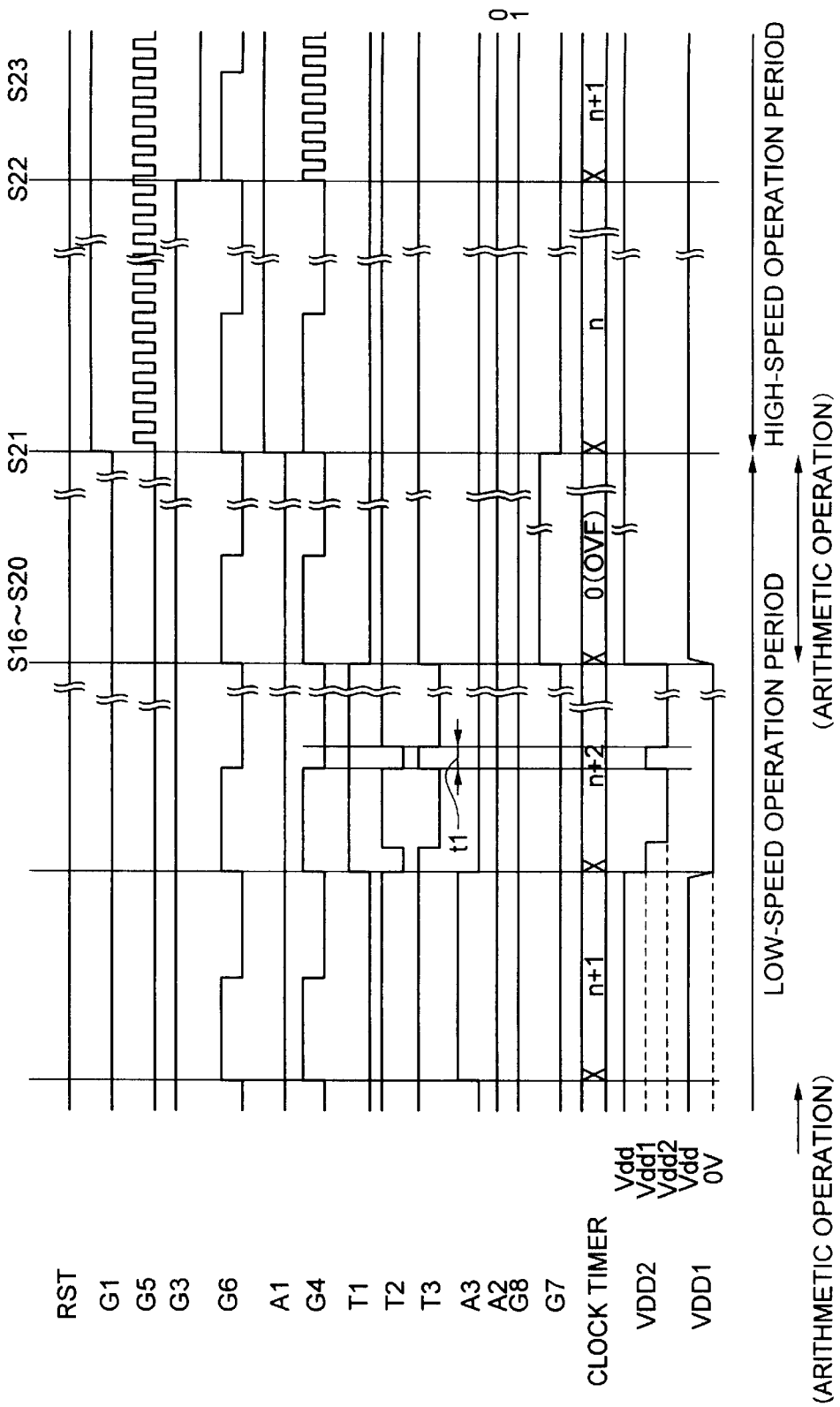
FIG. 14 is a timing chart showing an operation before/after a low-speed operation is changed to a high-speed operation according to the second embodiment.

Next, description will be made of the operation of the single chip microcomputer of the second embodiment constructed in the foregoing manner. FIG. 12 is a timing chart showing an operation before/after a high-speed operation is changed to a low-speed operation in the second embodiment; FIG. 13 a timing chart showing an operation during the low-speed operation in the second embodiment; FIG. 14 a timing chart showing an operation before/after the low-speed operation is changed to the high-speed operation in the second embodiment; and FIG. 15 a flow chart showing the operation of the single chip microcomputer according to the second embodiment of the present invention.

When the reset signal RST to the CPU 10 and the control circuit 22 is released, as shown in FIG. 12, the single chip microcomputer itself starts its normal operation (step S11). In the normal operation, the level of the oscillator control signal G1 is high, and the first and second oscillators 3 and 4 are in operating states. The level of the clock selection signal G3 is low, and the selector 5 selects the high-speed clock signal G5 and supplies it as the clock signal G4 to the CPU 10. On the other hand, although the level of the voltage selection signal T1 is low, the levels of the voltage selection signals T2 and T3 are high, and power supply voltage Vdd is supplied as the voltage VDD2 to the RAM 6, the level-shift circuit 9, the selector 5 and the clock timer 21. In addition, power supply voltage Vdd is supplied as the voltage VDD1 to the ROM 7, the peripheral circuit 8 and the CPU 10. Accordingly, the normal operation is carried out with a high-speed clock.

Subsequently, the CPU 10 sets a clock calendar in the RAM 6 based on the program stored in the ROM 7, and lowers the operation instruction signal A2. Then, the control circuit 22 raises the operation start signal G8 in synchronization with the next rising of the clock signal G6. Accordingly, the clock timer 21 is placed in an ON state (step S12).

Then, the CPU 10 lowers the switching signal A1 based on the program stored in the ROM 7. Upon receiving this signal, the control circuit 22 raises the clock selection signal G3 in synchronization with the next falling of the low-speed clock signal G6. Accordingly, the selector 5 selects the low-speed clock signal G6, and supplies it as the clock signal G4 to the CPU 10 (step S13).

Subsequently, the control circuit 22 counts the high-Speed clock signal G5 equivalent to two clock, and then lowers the oscillator control signal G1. Thus, the operation of the first oscillator 3 is stopped (step S14). The control circuit 22 raises the voltage selection signal T1 and lowers the voltage selection signal T2 in synchronization with the next rising of the control signal G6 after the rising of the clock selection signal G3 as described above. In this way, the voltage VDD2 is reduced from the power supply voltage Vdd to the lower voltage Vdd1. In addition, the rising of the voltage selection signal T1 places the N-channel transistor Tr5 in an ON state, and the voltage VDD is reduced from the power supply voltage Vdd to 0V. Therefore, the operations of the ROM 7, the peripheral circuit 8 and the CPU 10 are stopped (step S15).

The operation of the clock timer 21 has already been started, and thus the n-bit binary counter 23 counts the number of rising times of the clock signal G6.

Then, with the passage of time t1 after the rising of the voltage selection signal T1 and the failing of the voltage selection signal T2, the control circuit 22 raises the voltage selection signal T2, and lowers the voltage selection signal T3. Accordingly, the voltage VDD2 is reduced from the voltage Vdd1 to a much lower voltage Vdd2. On the other hand, since the voltage selection signal T1 is kept at a high level, the voltage VDD1 is kept at 0V.

Then, in synchronization with the falling of the control signal G6, the control circuit 22 raises the voltage selection signal T3, and lowers the voltage selection signal T2 Thus, the voltage VDD2 is increased from the voltage Vdd2 to the voltage Vdd1. Then, with the passage of time t1 after the rising of the voltage selection signal T3 and the falling of the voltage selection signal T2, the control circuit 22 raises the voltage selection signal T2, and lowers the voltage selection signal T3. In this way, the voltage VDD2 is reduced from the voltage Vdd1 to the voltage Vdd2.

Subsequently, during the low-speed operation, the control circuit 22 carries out control for the voltage selection signals T2 and T3 in synchronization with the rising/falling of the low-speed clock signal G6 like that described above.

When overflowing occurs in the n-bit binary counter 23 during the low-speed operation like that described above, as shown in FIG. 13, the OVF signal G7 is raised. Upon receiving this signal, the control circuit 22 lowers the voltage selection signal T1, and holds the voltage selections signals T2 and T3 at high levels. As a result, the voltages VDD1 and VDD2 are increased to power supply voltages Vdd (steps S16, and S17). Then, the CPU 10 resumes its operation, and starts the rewriting of the clock calendar stored in the RAM 6 (step S18). At this time, the counter value of the counter 23 in the clock timer 21 is reset to 0.

After the completion of the rewriting of the clock calendar, as shown in FIG. 14, the CPU 10 outputs the rewriting completion signal A3 to the control circuit 22. Upon receiving the rewriting completion signal A3, the control circuit 22 raises the voltage selection signal T1 in synchronization with the next falling or the clock signal G4, thereby setting the voltage VDD1 to 0V (step S20). Then, the control circuit 22 resumes control for the voltage selection signal T2 and T3, which is carried out in synchronization with the rising/falling of the low-speed clock signal G6 like that described above During the low-speed operation, the CPU 10, the control circuit 22 and the like carries out this operation each time overflowing occurs in the clock timer 21.

Then, specified processing is finished in the low-speed operation, and when an operation is changed from the low-speed operation to the normal operation, after the rewriting of the clock calendar, the CPU 10 raises the switching signal A1 in synchronization with any rising of the clock signal G4 based on the program stored in the ROM 7, while the voltage VDD1 is kept at the power supply voltage Vdd (step S19). In synchronization therewith, the control circuit 22 raises the oscillator control signal G1. Thus, the first oscillator 3 starts its operation (step 521), and the high-speed clock signal G5 is supplied to the selector 5.

Subsequently, the control circuit 22 lowers the control signal G3 in synchronization with the rising of the control signal G6. Accordingly, the selector 5 selects the high-speed clock signal G5, and supplies it as the clock signal G4 to the CPU 10 (step S22).

Then, the normal operation is carried out at a high speed (step 523).

As described above, according to the second embodiment, during the low-speed operation, the supply of voltages to the ROM 7 and the peripheral circuit 8 is completely cut off, and the supply of a voltage to the CPU 10 is carried out only at the tie of rewriting the clock calendar. Thus, compared with the first embodiment, power consumption can be reduced more.

In the second embodiment, during the low-speed operation, the voltage VDD2 is always supplied to the RAM 6, the clock timer 21, the second oscillator 4 and the control circuit 22. However, if an external clock timer is provided to enable an external circuit to carry out non maskable interrupt (NMI) or resetting, then a voltage can be supplied only to the RAM, and the supply of voltages and all the clock signals to the other internal circuits can be stopped. As a result, power consumption can be further reduced. In addition, a portion to receive the supply of a voltage may be limited to one which requires RAM data to be held. Recently, there have been great increases in RAM capacities. However, data to be held even while the other internal circuits are stopped is seldom stored in the entire RAM, and there will be no problems even if the supply of voltages to the other RAM areas is stopped. Therefore, power consumption can be considerably reduced.

While there has been described what are at present considered to be preferred embodiments or the invention, it will be understood that various modifications may be made thereto, and it is intended that the appended claims cover all such modifications as fall within the true spirit and scope of the invention.

What is claimed is:

1. A single chip microcomputer comprising:

a central processing unit;

a read only memory which stores a program executed by said central processing unit;

a random access memory which holds data processed by said central processing unit;

an oscillator which supplies a low-speed clock signal to said central processing unit;

a peripheral circuit which transfers a signal to said central processing unit and receives a signal from said central processing unit; and a control circuit, said control circuit supplying:
  a first voltage to said central processing unit, said read only memory, said random access memory and said peripheral circuit in synchronization with rising and falling of said low-speed clock signal, said first voltage enabling said central processing unit, said read only memory, said random access memory and said peripheral circuit to change their operations when operating with said low-speed clock signal; and
  a second voltage to said central processing unit with passage of predetermined time after said rising and falling of said low-speed clock signal, said second voltage being lower than said first voltage and enabling said central processing unit, said read only memory, said random access memory and said peripheral circuit to maintain their operations when operating with said low-speed clock signal.

2. A single chip microcomputer comprising:

a central processing unit;

a read only memory which stores a program executed by said central processing unit;

a random access memory which holds data processed by said central processing unit;

a first oscillator which supplies a first clock signal to said central processing unit;

a second oscillator which supplies a second clock signal having a frequency lower than that of said first clock signal to said central processing unit;

a clock selector which selects and supplies any one of said first and second clock signals to said central processing unit;

a peripheral circuit which transfers a signal to said central processing unit and receives a signal from said central processing unit;

a first step-down circuit which steps down a power supply voltage supplied to a power supply terminal to a first voltage, said first voltage enabling said central processing unit, said read only memory, said random access memory and said peripheral circuit to be operated with said second clock signal;

a second step-down circuit which steps down said power supply voltage to a second voltage, said second voltage being lower than said first voltage and enabling said central processing unit, said read only memory, said random access memory and said peripheral circuit to maintain their operations when operating with said second clock signal; and a control circuit which controls voltage supplied to said central processing unit, said read only memory, said random access memory and said peripheral circuit, and controls a clock signal supplied to said central processing unit in relation to said first and second clock signals, wherein said control circuit sets, during an operation of said central processing unit based on said second clock signal, a voltage supplied to each of said central processing unit, said read only memory, said random access memory, said clock selector and said peripheral circuit:
  equal to said first voltage in synchronization with rising and falling of said second clock signal, and
  equal to said second voltage with passage of predetermined time after said rising and falling of said second clock signal.

3. The single chip microcomputer according to claim 2, wherein said control circuit supplies a voltage only to said random access memory while said first and second oscillators are both in operation stopped states.

4. The single chip microcomputer according to claim 3, wherein said voltage supplied to said random access memory while said first and second oscillators are both in operation stopped states is supplied only to a partial area of said random access memory.

5. The single chip microcomputer according to claim 2, further comprising a clock timer which counts the number of pulses of said second clock signal while said central processing unit is in operation stopped state, wherein said control circuit sets a voltage supplied to said clock timer
  equal to said first voltage in synchronization with rising and falling of said second clock signal, and
  equal to said second voltage with passage of predetermined time after said rising and falling of said clock signal.

6. The single chip microcomputer according to claim 2, further comprising a selector which selects a clock signal to be supplied to said central processing unit from said first and second clock signals according to an instruction from said control circuit.

7. The single chip microcomputer according to claim 2, wherein said control circuit supplies said power supply voltage to each of said central processing unit, said read only memory, said random access memory and said peripheral circuit during an operation of said central processing unit based on said first clock signal.

* * * * *